Figure 1:
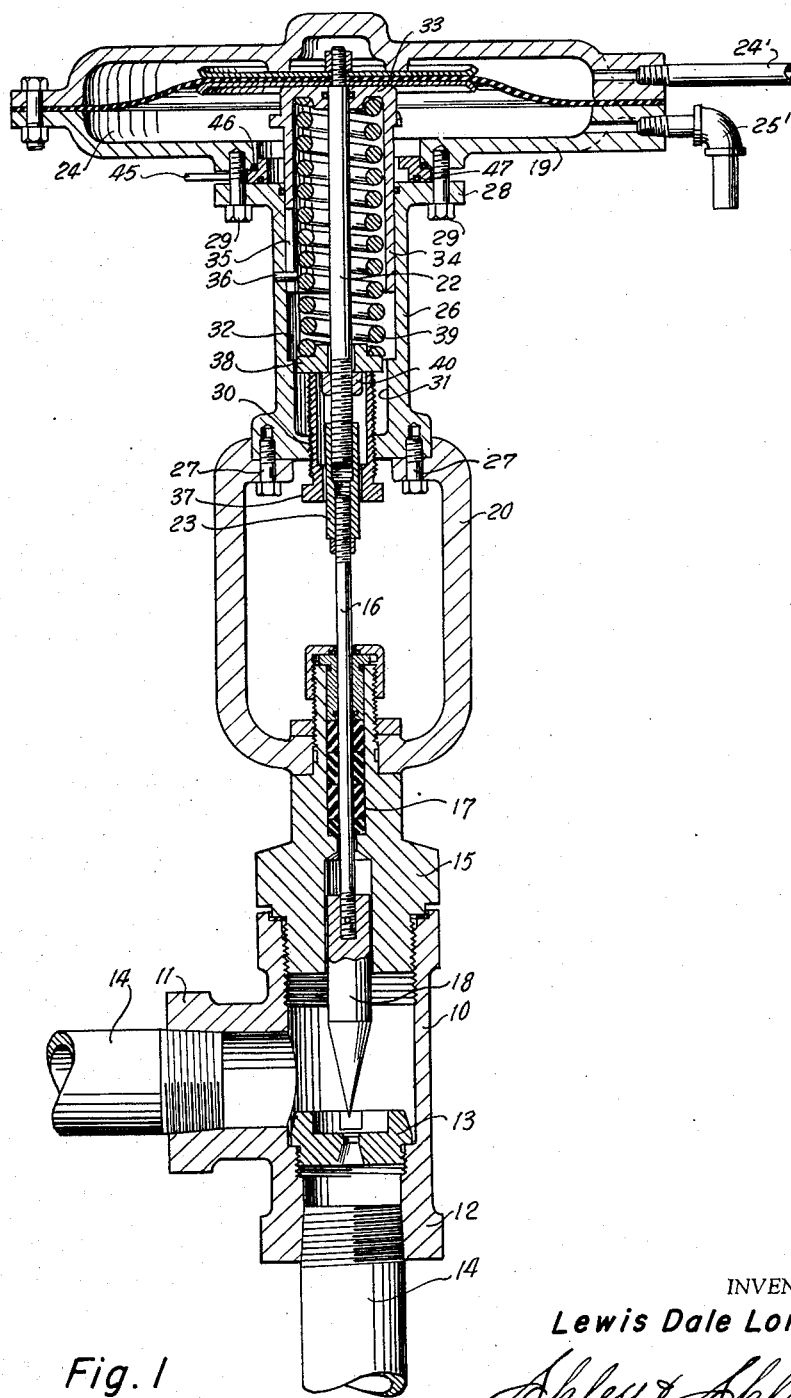

Sept. 8, 1959 L. D. LONG 2,903,011
REVERSIBLE MOTOR VALVES
Filed July 9, 1956 3 Sheets-Sheet 1

INVENTOR
Lewis Dale Long

BY
ATTORNEYS

INVENTOR
Lewis Dale Long
BY
ATTORNEYS

United States Patent Office 2,903,011
Patented Sept. 8, 1959

2,903,011

REVERSIBLE MOTOR VALVES

Lewis D. Long, Tulsa, Okla., assignor to National Tank Company, Tulsa, Okla., a corporation of Nevada Application July 9, 1956, Serial No. 596,485

7 Claims. (Cl. 137—270)

This invention relates to new and useful improvements in reversible motor valves.

The invention is particularly concerned with motor or power-operated valves wherein the valve is moved between opened and closed positions by a diaphragm, piston, or other pressure-responsive means, and has as its principal objective the provision of an improved valve which may be shifted from a pressure-opening condition to a pressure-closing condition.

There are many instances in which it is desirable to utilize a valve which is normally closed, and which may be partially or fully opened by application of gas or other fluid under pressure to a diaphragm or other actuating means connected to the valve. There are also instances in which it is desirable to utilize a valve which is normally open, and which is closed by the application of a fluid under pressure, and such valves are usually a distinct physical structure differently constructed from normally-closed valves. Accordingly, it has been necessary to manufacture two types of valves and to maintain stocks of such valves on hand so that they may be readily available for use or for sale. Under these conditions, it is apparent that a single valve structure which may be converted to either a normally-open or a normally-closed valve is highly desirable, both from the viewpoint of economies of manufacture, as well as economies realized in the stocking, storing, and handling of two distinct types of valves.

It is, therefore, an important object of this invention to provide an improved reversible motor valve which may be converted from a normally-open valve to a normally-closed valve, and vice versa, without disassembly of the valve structure.

A particular object of the invention is to provide an improved reversible motor valve which by very simple manipulation of the valve parts from the outside of the valve structure may be converted to either a normally-open or a normally-closed motor valve.

Another object of the invention is to provide an improved motor valve of the character described which is simple and durable in structure, and in which those parts which are moved or shifted in converting the valve from one condition to another are protected against accidental dislodgment, and against movement due to vibration or other conditions of operation which may be encountered.

A construction designed to carry out the invention will be hereinafter described, together with other features of the invention.

Figure 2:
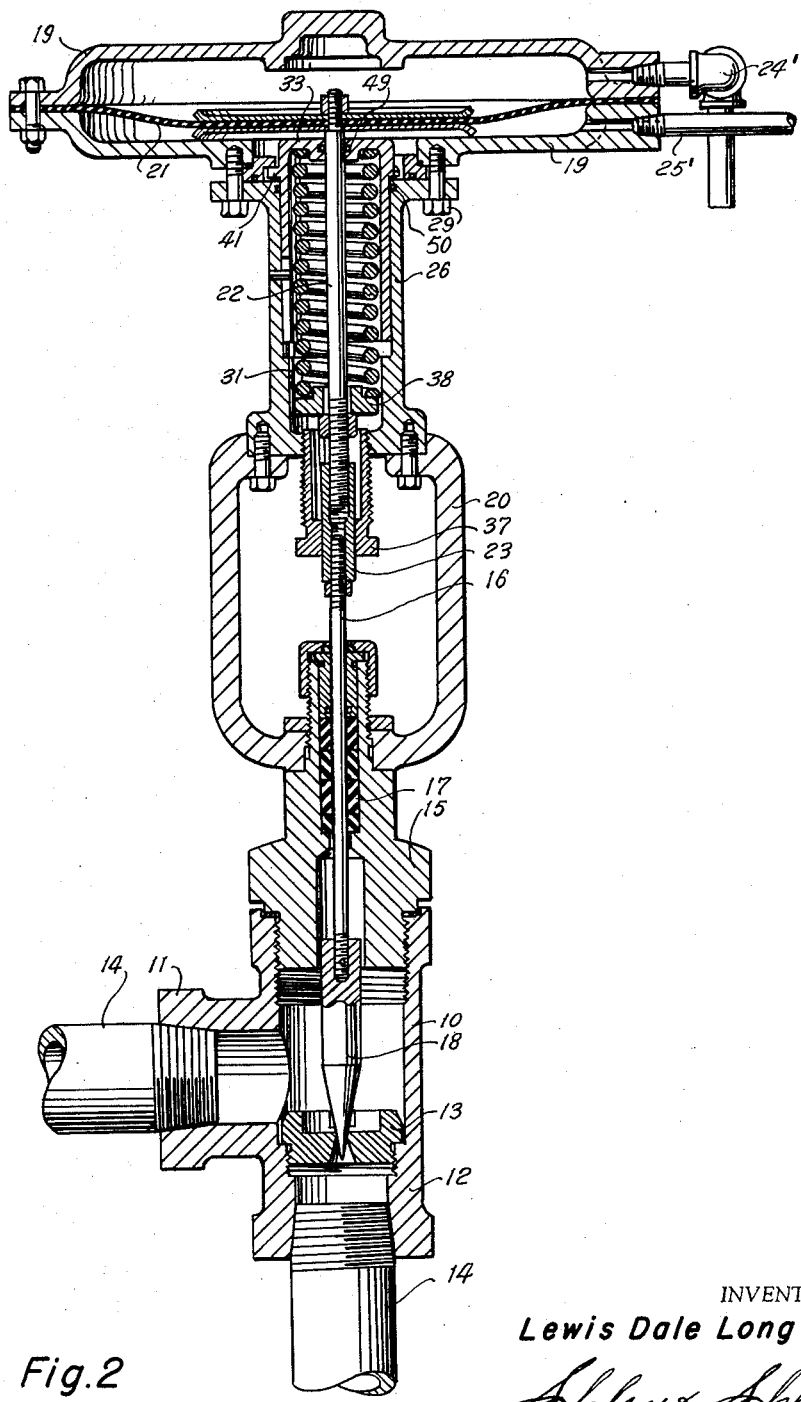
Figure 3:
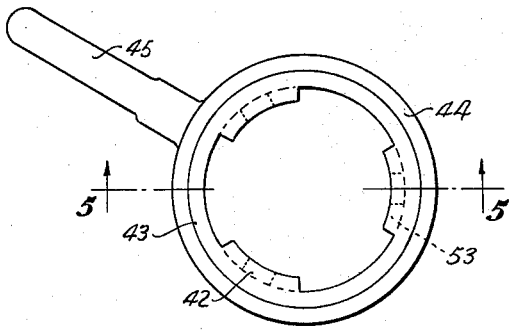
Figure 4:
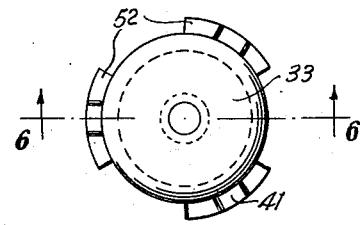
Figure 5:
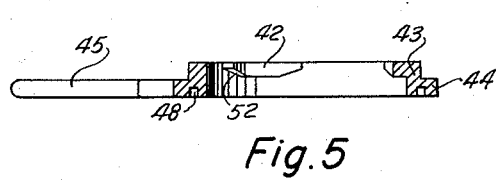
Figure 6:
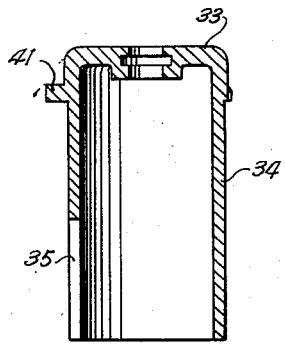
Figure 7:
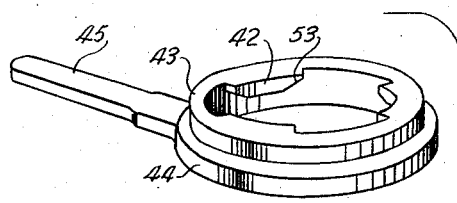
Figure 7:
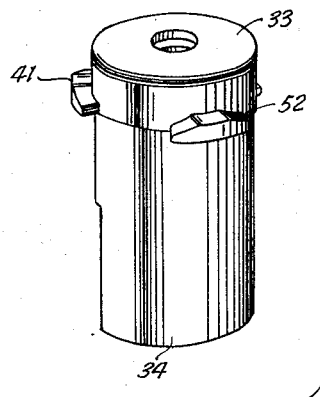

The invention will be more readily understood from a reading of the following specification and by reference to the accompanying drawings, wherein an example of the invention is shown, and wherein:

Fig. 1 is a vertical, sectional view of a reversible motor valve constructed in accordance with this invention and showing the valve in a normally-open condition, Fig. 2 is a view similar to Fig. 1 showing the valve in a normally-closed condition, Fig. 3 is a plan view in elevation of the locking ring, Fig. 4 is a plan view in elevation of the locking cap for the upper end of the valve spring, Fig. 5 is a cross-sectional view taken on the line 5—5 of Fig. 3, Fig. 6 is a cross-sectional view taken on the line 6—6 of Fig. 4, and Fig. 7 is an exploded view in perspective of the locking ring and the locking cap.

In the drawings, the numeral 10 designates a valve body having a fluid inlet 11 and a fluid outlet 12 communicating through a removable valve seat 13. Suitable conductors 14 may be connected to the inlet and outlet. A bonnet 15 is provided for the upper end of the valve, and an actuating connection or rod 16 extends downwardly through a packing gland 17 in the bonnet, and carries on its lower end a valve core 18 adapted to engage the seat 13 to close off the valve. Upward and downward movement of the core 18 by the rod 16 results in opening and closing of the valve structure as may be desired.

In accordance with the usual structure of motor valves, a diaphragm housing 19 is provided at the upper end of the valve structure, being connected to the valve body 10 through the usual open yoke structure 20. A pressure-responsive member or diaphragm 21 is provided within the housing 19 and connected to the rod 16 through an actuating rod 22 having its lower end joined to the upper end of the rod 16 by an adjustable coupling member 23 provided for varying the spacing between the valve core 18 and the diaphragm 21. A pressure connection 24' communicates through the wall of the housing 19 with the space above the diaphragm 21, and a second pressure connection 25' communicates through the wall of the housing 19 with the space 24 enclosed below the diaphragm 21. Obviously, the application of pressure above the diaphragm will tend to move the valve downwardly to a closed position, and application of pressure beneath the diaphragm will tend to move the diaphragm upwardly to an open position.

To provide for shifting the valve structure from a pressure-opening condition to a pressure-closing condition, the diaphragm housing 19 is connected to the yoke 20 through an upstanding collar 26 joined by bolts 27 at its lower end to the yoke 20 and provided at its upper end with an annular flange 28. Bolts 29 extend through the flange 28 into the lower side of the diaphragm housing 19, and tightening of the bolts 29 rigidly connects the collar 26 to the diaphragm housing. A screw-threaded opening 30 at the lower end of the collar 26 opens into an enlarged bore 31 in the lower portion of the collar 26, the bore 31 in turn, opening into a further enlarged counter bore 32 extending from the bore 31 to the upper end of the collar.

A cap or thrust member 33 is received upon the rod 22 beneath the diaphragm 21 and has a depending, cylindrical skirt 34 extending downwardly into the bore 32 and being slidable therein. A longitudinal slot 35 is provided in the wall of the skirt 34 and receives a pin 36 projecting from the collar 26 into the bore 32 for preventing rotation of the skirt within the bore 32. A screw-threaded, tubular sleeve or stop member 37 is mounted in the screw-threaded opening 30 and extends upwardly into the enlarged bore 31 when the valve is in pressure-closing condition, as illustrated in Fig. 1. A bottom plate 38 surrounds the rod 22 above the upper end of the stop member 37, and a coiled, compression spring 39 encircles the rod 22 and is confined between the cap member 33 and the bottom plate 38. Further, a stop nut 40 is provided upon the lower end of the rod 22 below the bottom plate 38, the nut 40 being of such external diameter as to be capable of passing downwardly into the tubular stop member 37.

In the pressure-closing condition of the motor valve, as illustrated in Fig. 1, the stop member 37 is screwed upwardly into the enlarged bore 31, and the bottom plate 38 engages and rests upon the upper end of the stop member. In the position of the valve shown, the valve core is fully retracted from the valve seat 13 and the nut 40 has moved upwardly with the rod 22 only to the plane of the top edge of the member 37 so that the downward thrust of the spring 39 continues to be received by the stop member 37. At the same time, the upward thrust of the spring against the top thrust member 33 is received by the underside of the diaphragm 19 with which the member is in engagement, and hence, the coil spring 39 constantly tends to move the valve toward a fully open position. Obviously, the application of a suitable fluid under pressure through the connection 24′ will cause the diaphragm to apply a downward thrust to the rods 16 and 22, thus compressing the spring 39 and moving the valve toward a closed position. In this manner, a normally-open or pressure-closing motor valve structure is provided.

To provide for shifting of the motor valve structure to a pressure-opening, or normally-closed condition, the cap-like top plate 33 is provided on its periphery with radial extending bayonet joint lugs 41 adapted to be received under and retained by the corresponding bayonet joint lugs 42 of a locking ring 43 positioned between the flange 28 of the collar 26 and the underside of a diaphragm housing 19. As shown in Figs. 1 and 7, the ring 43 is formed with an external, radially directed flange 44 about its lower periphery, and this flange is adapted to be engaged between the flange 28 of the collar 26 and the underside of the diaphragm housing 19. Accordingly, by loosening of the bolts 29, the ring 43 may be rotated by means of the handle 45 projecting laterally from the ring, and upon tightening of the bolts 29, the ring is securely clamped in position. An O-ring 46 formed of rubber-like material is desirably recessed into the bottom of the diaphragm housing 19 to engage and seal off the upper surface of the flange 44, while a similar O-ring 47 is received within an annular groove 48 formed in the bottom of the ring 43 for sealing between the ring and the flange 28.

In the condition of the motor valve shown in Fig. 1, the bayonet joint lugs 41 of the top thrust member 33 are in vertical alinement with the spaces between the lugs 42 of the ring 43 whereby the member 33 is free to move upwardly and downwardly without restraint by the ring 43 and its lugs 42. The member 33 is held against rotation by reason of the slot and pin structure 35 and 36, and the ring 43 is held against rotation since it is clamped in position by tightening of the bolts 29.

When it is desired to shift the motor valve structure to the condition illustrated in Fig. 2 in which the valve is normally closed, or pressure opening, pressure is applied on the upper side of the diaphragm 21 through the inlet conductor 24′ until the diaphragm is forced to its lowermost position and the bayonet joint lugs 41 of the top thrust member 33 have been moved downwardly between the lugs 42 of the ring 43. Now, the bolts 29 may be loosened, and the ring 43 rotated by means of the handle 45 until the lugs 42 are moved into vertical alinement with the lugs 41, after which the bolts 29 are again tightened to clamp the ring in its new position. Since the lugs 42 now overlie the lugs 41, upward movement of the cap or thrust member 33 is prevented, and the upward thrust of the spring 39 is transferred through the lugs 41 to the ring 43 and thence to the body of the valve structure. Hence, the diaphragm is no longer subjected to the upward thrust of the spring.

To complete the conversion, the screw-threaded sleeve or stop member 37 is screwed downwardly to the position shown in Fig. 2 in which its upper end is barely within the enlarged bore 31, and hence, the bottom plate 38 is brought to bear upon the stop nut 40 which is carried upon the rod 22. The support of the sleeve 37 for the spring is thus removed, and the downward thrust of the spring is transferred from the body of the valve to the actuating rod or connection extending between the diaphragm and the valve core 18. In this condition of the valve, the spring constantly urges the valve downwardly toward a closed position, and it is necessary to admit a fluid under pressure through the connection 25′ into the space beneath the diaphragm 21 to force the diaphragm and actuating rod structure upwardly to move the valve toward an open position.

It is to be noted that the conversion of the motor valve from one condition to another may be very quickly carried out without disassembly of the valve, it only being necessary to loosen the bolts 29 momentarily and to have a suitable tool for screwing the sleeve 37 upwardly or downwardly within the screw-threaded bore 30. Of course, it is also necessary to switch the supply of actuating fluid under pressure from the connection 24′ to the connection 25′, or vice versa.

In accordance with conventional practice, suitable seals at various points in the structure may be provided such as shown at 49 in the space between the rod 22 and the top thrust member 33, as well as in the upper portion of the cylindrical bore 32 around the periphery of the skirt 34, as shown at 50.

The nature of the readily releasable joint between the top thrust member 33 and the ring 43 may be of any suitable or desirable nature, the bayonet type of joint illustrated having been found most suitable, and it having been found advantageous to chamfer or taper the edges of the lugs 41 and 42, as shown, at 52 and 53 respectively. Thus, engagement and disengagement of the lugs is facilitated and jamming or locking of the joint is substantially avoided.

In many respects, the valve structure is standard in design and arrangement, the innovations residing primarily in means for transferring the thrust of the spring 39 selectively between the valve body, the diaphragm, and the actuating connection between the diaphragm and the valve core. It is quite apparent that this shiftable or convertible spring structure may be positioned above the diaphragm as well as below the same by a simple reversal of the illustrated structure.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. Structure to shift a motor valve between a pressure-opening condition and a pressure-closing condition, including, a housing for the valve motor, a tubular sleeve connecting the housing to the body of the valve, a skirted thrust cap reciprocally mounted in the sleeve for movement into the housing, a locking ring releasably clamped between the sleeve and the housing, a releasable lock between the ring and the thrust cap for holding the cap against upward movement into the housing, an actuating rod connection extending through the cap and into the housing, a load-bearing projection on the connection, a stop sleeve around the connection and movably carried by the valve body for movement upward around the projection and retraction downwardly to expose the projection, a thrust plate slidably mounted on the connection and positioned above the projection with a diameter as to engage the stop sleeve when the latter is moved upwardly, and a compression spring confined between the thrust plate and the thrust cap.

2. Structure to shift a motor valve between a pressure-opening condition and a pressure-closing condition, including, a motor housing and a valve body, an actuating connection between said body and housing, spring means between said body and housing, a thrust cap on one end of said connection and engaging one end of said spring means for transferring the thrust of the spring means in one direction toward the housing, means for connecting the cap to the body of the valve to transfer the spring thrust to the body including means for holding the cap against rotation and an externally rotatable ring around the cap connected to the body, a bayonet joint between the ring and the cap and means for securing the ring against rotation, a thrust plate at the other end of the spring for transferring the thrust of the spring in the opposite direction, and means for shifting the thrust of the other end of the spring from the body of the valve to the actuating connection.

3. Structure to shift a motor valve between a pressure-opening condition and a pressure-closing condition, including, a motor housing and a valve body, an actuating connection between said body and housing, spring means between said body and housing, a thrust cap on one end of said connection and engaging one end of said spring means for transferring the thrust of the spring means in one direction toward the housing, means for connecting the cap to the body of the valve to transfer the spring thrust toward the body including means for holding the cap against rotation along with an externally rotatable ring around the cap connected to the body and a bayonet joint between the ring and cap, a thrust plate at the other end of the spring for transferring the thrust of the spring in the opposite direction toward the body, and means shifting the thrust of the other end of the spring from the body of the valve to the actuating connection.

4. Structure to shift a motor valve between a pressure-opening condition and a pressure-closing condition, including, a motor housing and a valve body, an actuating connection between said body and housing, a spring, a retaining member between one end of the spring and the motor housing, means for releasably connecting the retaining member to the valve body to hold the spring from bearing on the motor housing including means for holding the retaining member against rotation along with an externally rotatable ring around the retaining member connected to the valve body and a bayonet joint between the ring and the retaining member, a supporting element engaged by the opposite end of the spring, and means for selectively causing the supporting element to be carried by the valve body and the actuating connection.

5. The structure of claim 4 wherein the bayonet joint between the retaining member and the rotatable ring includes bayonet joint lugs which are chamferred or tapered.

6. The structure of claim 4 including means for securing the ring against rotation with respect to the valve body.

7. Structure to shift a motor valve between a pressure-opening condition and a pressure-closing condition, including, a motor housing and a valve body, an actuating connection between said body and housing, a spring about the actuating connection, a retaining member between one end of the spring and the motor housing, means for releasably connecting the retaining member to the valve body to hold the spring from the motor housing including means for holding the retaining member against rotation with reference to the body along with an externally rotatable ring around the retaining member connected to the body and a releasable joint between the ring and the retaining member, a supporting element for the spring to bear the spring loading in the direction toward the valve body, and a means for selectively applying the spring-loaded supporting element to the valve body and the actuating connection.

References Cited in the file of this patent

UNITED STATES PATENTS

| | | |
|---|---|---|
| 1,620,322 | Browne | Mar. 8, 1927 |
| 2,417,154 | Dath | Mar. 11, 1947 |
| 2,697,599 | Vandal | Dec. 21, 1954 |

FOREIGN PATENTS

| | | |
|---|---|---|
| 921,607 | Germany | Dec. 23, 1954 |